United States Patent
Keremane et al.

(10) Patent No.: US 9,996,436 B2
(45) Date of Patent: Jun. 12, 2018

(54) SERVICE PROCESSOR TRAPS FOR COMMUNICATING STORAGE CONTROLLER FAILURE

(71) Applicant: NetApp Inc., Sunnyvale, CA (US)

(72) Inventors: Hrishikesh Keremane, Sunnyvale, CA (US); Vijay Singh, San Jose, CA (US); David Andrew Allender, San Jose, CA (US)

(73) Assignee: NetApp Inc., Sunnyvale, CA (US)

( * ) Notice: Subject to any disclaimer, the term of this patent is extended or adjusted under 35 U.S.C. 154(b) by 98 days.

(21) Appl. No.: 14/920,391

(22) Filed: Oct. 22, 2015

(65) Prior Publication Data
US 2017/0116099 A1 Apr. 27, 2017

(51) Int. Cl.
*G06F 11/00* (2006.01)
*G06F 11/20* (2006.01)
*G06F 3/06* (2006.01)

(52) U.S. Cl.
CPC ........ *G06F 11/2092* (2013.01); *G06F 3/0604* (2013.01); *G06F 3/0619* (2013.01); *G06F 3/0629* (2013.01); *G06F 3/0683* (2013.01); *G06F 11/2069* (2013.01); *G06F 11/2071* (2013.01); *G06F 2201/805* (2013.01)

(58) Field of Classification Search
CPC .. G06F 11/2069; G06F 11/2071; G06F 3/067; G06F 11/2033; G06F 11/2038
See application file for complete search history.

(56) References Cited

U.S. PATENT DOCUMENTS

| | | | | |
|---|---|---|---|---|
| 2003/0188233 A1* | 10/2003 | Lubbers | ............ | G06F 11/2069 714/100 |
| 2008/0162984 A1* | 7/2008 | Kalra | ............... | H04L 41/0213 714/4.11 |
| 2012/0192006 A1* | 7/2012 | Qi | ........................ | G06F 11/0757 714/6.22 |
| 2013/0007512 A1* | 1/2013 | Amin | .................. | G06F 11/2033 714/10 |
| 2013/0132766 A1* | 5/2013 | Bhatia | ................. | G06F 11/2089 714/5.11 |
| 2014/0189277 A1* | 7/2014 | Taki | ...................... | G06F 13/161 711/167 |
| 2016/0203080 A1* | 7/2016 | Bert | ..................... | G06F 12/0835 711/114 |
| 2017/0046268 A1* | 2/2017 | Ummadi | ............ | G06F 12/0875 |

* cited by examiner

*Primary Examiner* — Charles Ehne
(74) *Attorney, Agent, or Firm* — Cooper Legal Group, LLC (57) ABSTRACT

One or more techniques and/or computing devices are provided for communicating storage controller failures utilizing service processor traps. A first storage controller, of a first storage cluster, has a disaster recovery relationship with a second storage controller of a second storage cluster. The first storage controller comprise a first service processor configured to monitor health of the first storage controller. Responsive to identifying a failure of the first storage controller, the first service processor uses stored communication configuration of a second service processor of the second storage controller to send a service processor trap to the second service processor. In this way, the second service processor initiates a switchover operation by the second storage controller to provide clients with failover access to data previously available through the first storage controller before the failure. Proactive notification of storage controller failures utilizing service processor traps reduces client data access disruptions.

20 Claims, 8 Drawing Sheets

SERVICE PROCESSOR TRAPS FOR COMMUNICATING STORAGE CONTROLLER FAILURE

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with access to data stored within a second storage device (e.g., failover access to replicated data within the second storage device) and/or other storage devices (e.g., primary access to data stored within a third storage device). The first storage controller and the second storage controller may be configured according to a disaster recovery relationship, such that the second storage controller may provide failover access to replicated data that was replicated from the first storage device to the second storage device (e.g., a switchover operation may be performed where the second storage controller assumes ownership of the second storage device and/or other storage devices previously owned by the first storage controller so that the second storage controller may provide clients with failover access to data within such storage devices).

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

If the first storage cluster merely comprises the first storage controller and the second storage cluster merely comprises the second storage controller (e.g., single storage controller cluster configurations that may be cost effective due to clusters merely comprising single storage controllers), then there may not be local high availability storage controllers paired with the first storage controller or the second storage controller that could otherwise provide relatively fast local takeover for a failed storage controller for non-disruptive client access to data of the failed storage controller (e.g., if the first storage cluster comprised a third storage controller having a high availability pairing with the first storage controller, then the third storage controller could quickly perform a local takeover for the first storage controller in the event the first storage controller fails). Instead, a cross-cluster switchover operation may need to be performed if a storage controller fails. Cross-cluster remote detection of a storage controller failure (e.g., the second storage controller, within the second storage cluster, detecting a failure of the first storage controller within the first storage cluster) may utilize timeouts, manual switchover, and/or other relatively slow or imprecise techniques that may not provide adequate non-disruptive client access to data (e.g., a client may lose access to data for more than 2 minutes while waiting on a manual switchover from a failed storage controller to a surviving storage controller). Thus, it may be advantageous to quickly and reliably detect storage controller failure cross-cluster for automatic implementation of switchover operations.

DETAILED DESCRIPTION

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for communicating storage controller failures utilizing service processor traps are provided. For example, a first storage controller, of a first storage cluster, may comprise a first service processor configured to monitor health of the first storage controller. A second storage controller, of a second storage cluster, may comprise a second service processor configured to monitor health of the second storage controller. The service processors may exchange communication configurations so that the service processors may communicate with one another, such as in the event a storage controller fails (e.g., a service processor may have a battery used to power the service processor in the event a storage controller, comprising the service processor, has a power failure). Responsive to the first service processor determining a failure of the first storage controller, the first service processor may send a service processor trap to the second service processor using communication configuration of the second service processor. The second service processor may initiate an automatic switchover operation from the first storage controller to the second storage controller for providing clients with failover access to data, previously accessible to clients through the first storage controller (e.g., before the failure), based upon the service processor trap and the second storage controller being a disaster recovery partner for the first storage controller.

Figure 1:
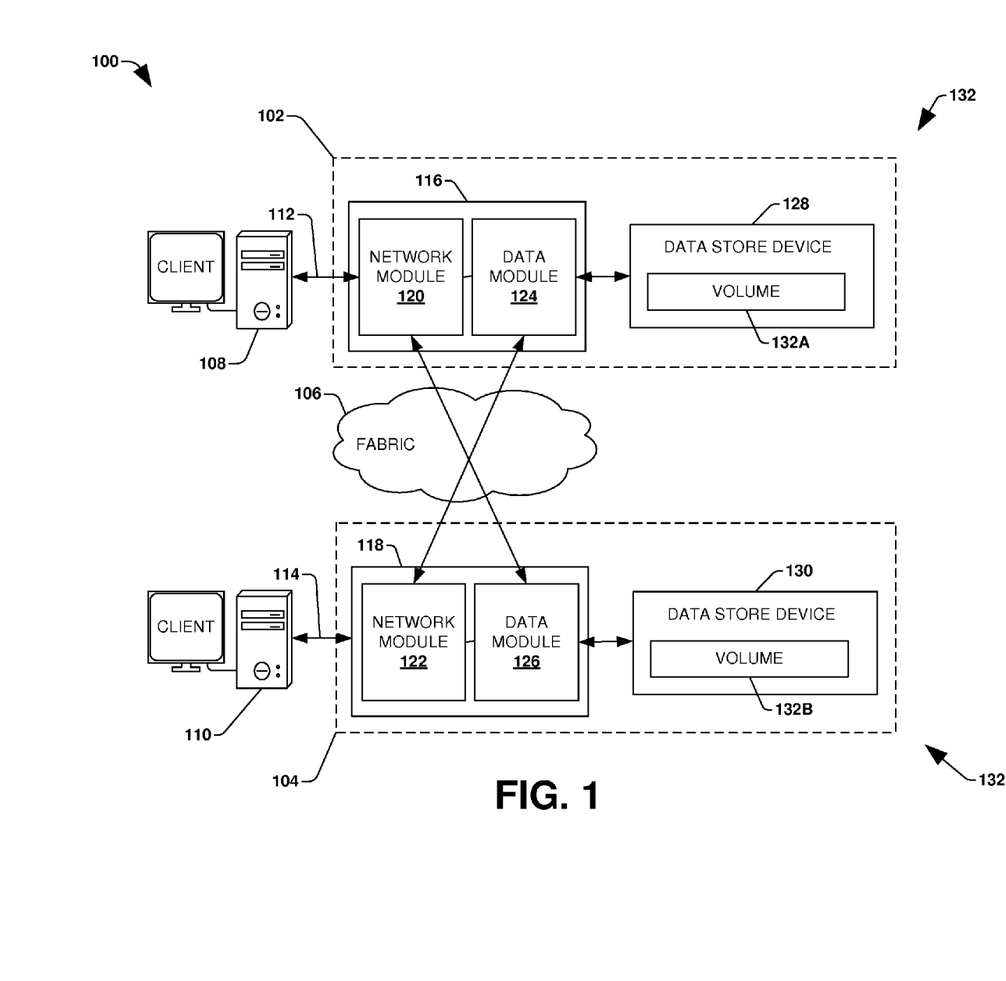
FIG. 1 is a component block diagram illustrating an example clustered network in accordance with one or more of the provisions set forth herein.

To provide context for communicating storage controller failures utilizing service processor traps, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that communicating storage controller failures utilizing service processor traps may be implemented within the clustered network environment 100. In an example, the node 116 (e.g., a first storage controller) may comprise a first service processor configured to detect a failure of the node 116. Responsive to detecting the failure, the first service processor may send a service processor trap to a second service processor of the node 118 (e.g., a second storage controller). The second service processor may initiate an automatic switchover from the node 116 to the node 118. It may be appreciated that communicating storage controller failures utilizing service processor traps may be implemented for and/or between any type of computing environment, and may be transferrable between physical devices (e.g., node 116, node 118, etc.) and/or a cloud computing environment (e.g., remote to the clustered network environment 100).

Figure 2:
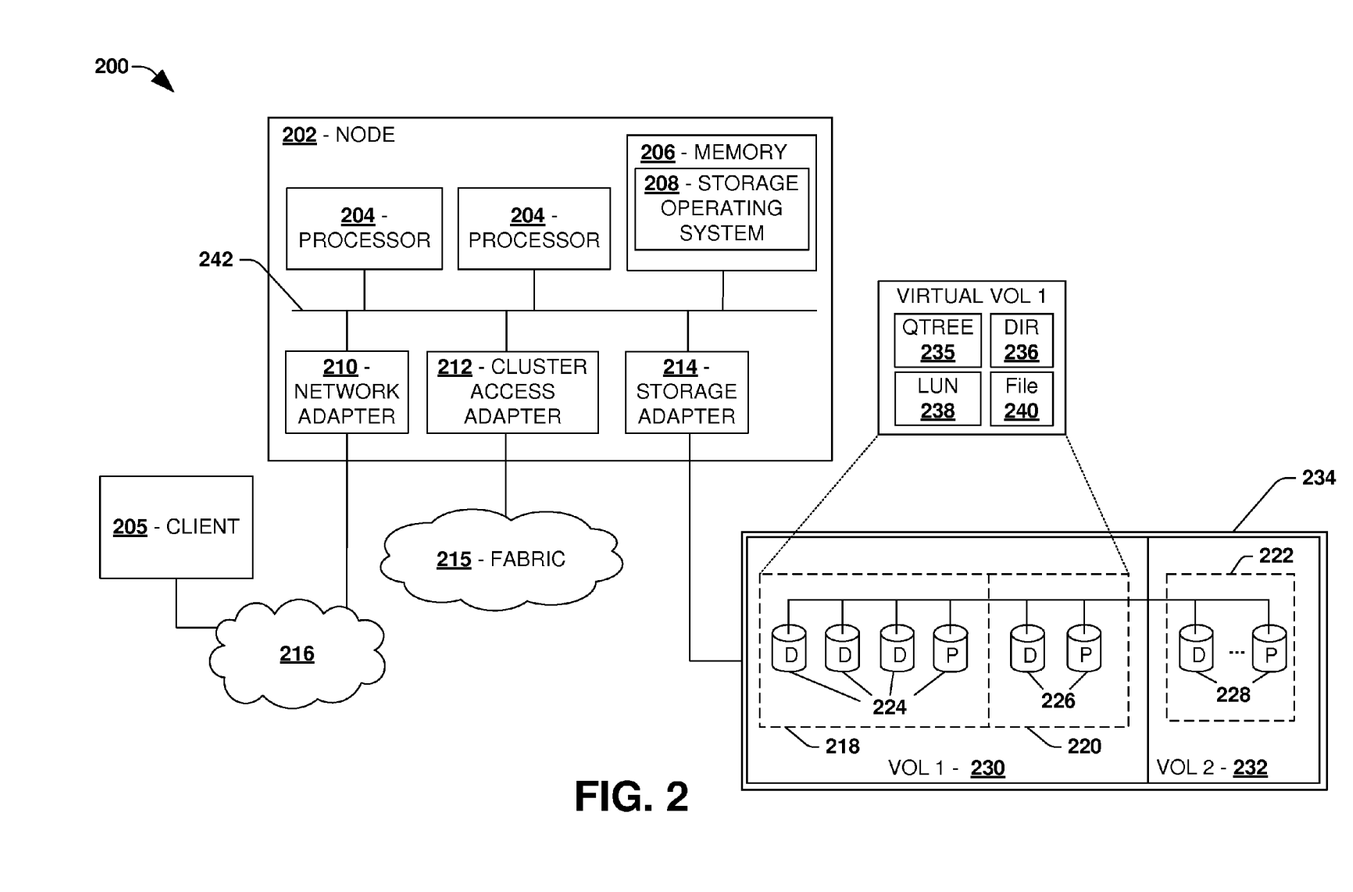
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that communicating storage controller failures utilizing service processor traps may be implemented for the data storage system 200. In an example, the node 202 (e.g., a first storage controller) may comprise a first service processor configured to detect a failure of the node 202. Responsive to detecting the failure, the first service processor may send a service processor trap to a second service processor of a second node (e.g., a second storage controller). The second service processor may initiate an automatic switchover from the node 202 to the second node. It may be appreciated that communicating storage controller failures utilizing service processor trap may be implemented for and/or between any type of computing environment, and may be transferrable between physical devices (e.g., node 202, host 205, etc.) and/or a cloud computing environment (e.g., remote to the node 202 and/or the host 205).

Figure 3:
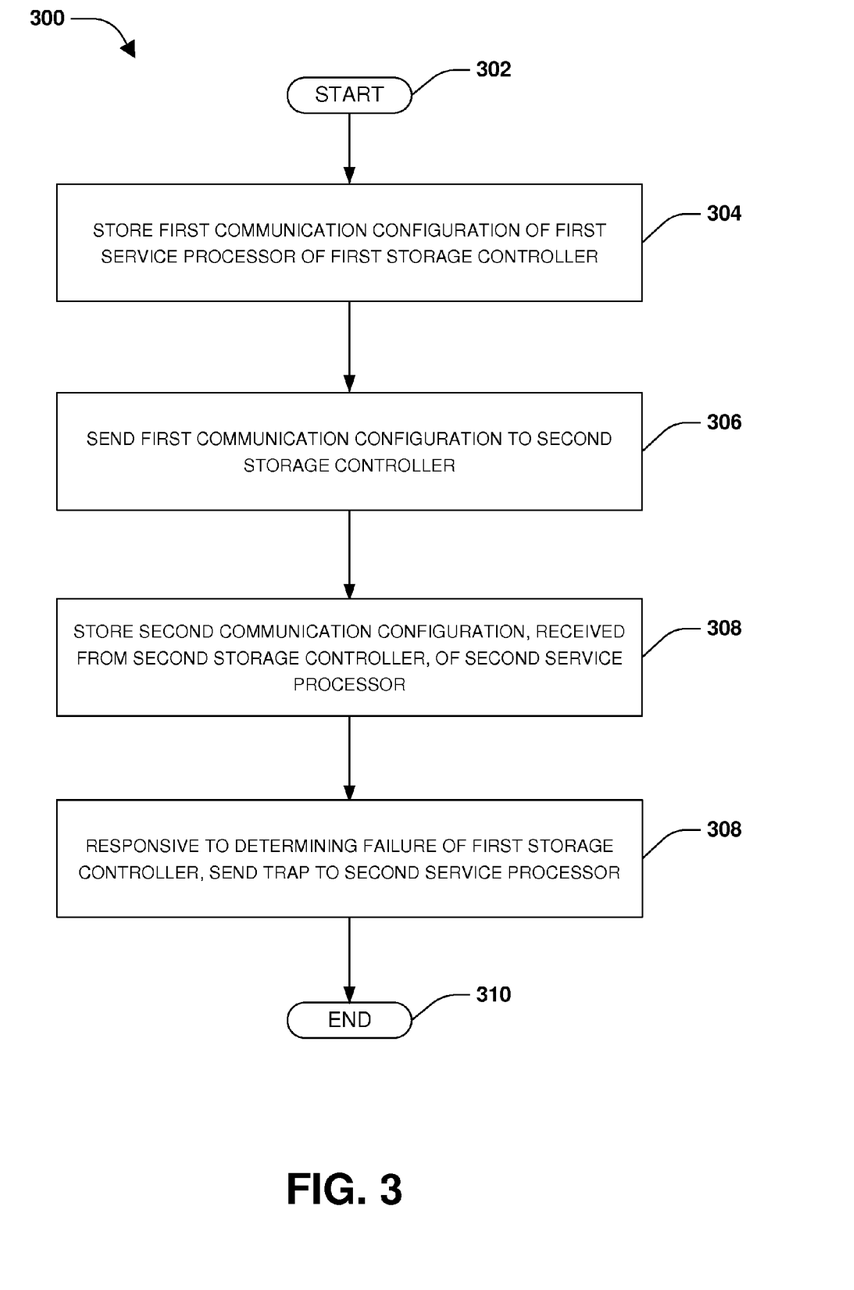
FIG. 3 is a flow chart illustrating an exemplary method of communicating storage controller failures utilizing service processor traps.

One embodiment of communicating storage controller failures utilizing service processor traps is illustrated by an exemplary method 300 of FIG. 3. A first storage cluster may comprise a first storage controller configured to provide clients with primary access to data stored within a one or more storage devices owned by the first storage controller. A second storage cluster may comprise a second storage controller configured as a disaster recovery partner for the first storage controller. Data and/or configuration may be replicated from the first storage cluster to the second storage cluster (e.g., replication of data into storage devices owned by the first storage controller but located at the second storage cluster). In this way, if the first storage controller fails, then the second storage controller may perform a switchover operation (e.g., to acquire ownership of the storage devices comprising the replicated data) to provide clients with access to replicated data. Upon recovery of the first storage controller, a switchback operation may be performed to return ownership of the storage devices back to the first storage controller so that the first storage controller can provide clients with primary access to such storage devices.

Unfortunately, if the second storage controller utilizes timeouts and/or unreliable detection methods for identifying, cross-cluster, failure of the first storage controller, then a significant delay may occur from when the first storage controller fails and the second storage controller completes the switchover operation to provide clients with failover access to the replicated data. Thus, clients may experience disruptive access to data. Accordingly, as provided herein, the first storage controller comprises a first service processor (e.g., a microcontroller comprising an operating system and storage controller health monitoring functionality) configured to monitor health of the first storage controller. In response to the first service processor detecting failure of the first storage controller (e.g., a battery may be used to power the first service processor in the event the first storage controller has a power failure), the first service processor may quickly and reliably send a service processor trap to a second service processor of the second storage controller for automatically initiating the switchover. In this way, clients may experience non-disruptive access to data.

At 302, the method 300 starts. At 304, a first communication configuration of the first service processor may be stored, such as by the first service processor or the first storage controller, within memory or persistent storage. The first communication configuration may comprise a first internet protocol (IP) address of the first service processor, a first port used by the first service processor, first authentication used by the first service processor (e.g., a shared secret), etc. At 306, the first communication configuration may be sent to the second storage controller. In an example of sending the first communication configuration, the first communication configuration may be stored within a first disk mailbox (e.g., a storage device, such as a hard drive) owned by the first storage controller, but not owned by the second storage controller. The first disk mailbox may be accessible to the second storage controller and/or the second service processor through the use of raw read operations. In this way, the first disk mailbox may be read by the second storage controller and/or the second service processor (e.g., such as while in an out-of-band mode where network connectivity between the first storage controller and the second storage controller may be unreliable or unavailable). Thus, the second service processor may automatically configure service processor traps based upon the first communication configuration so that service processor traps may be sent to the first service processor for automatically triggering a switchover operation from the second storage controller to the first storage controller in the event the second storage controller fails.

At 308, a second communication configuration, received from the second storage controller, of the second service processor may be stored by the first service processor (e.g., and/or by the first storage controller). The second communication configuration may comprise a second IP address of the second service processor, a second port used by the second service processor, second authentication used by the second service processor (e.g., a shared secret), etc. In an example of receiving the second communication configuration, the first service processor may read the second communication configuration from a second disk mailbox owned by the second storage controller, but not owned by the first storage controller. The second disk mailbox may be accessible to the first storage controller and/or the first service processor using raw read operations. In this way, the second disk mailbox may be read by the first storage controller and/or the first service processor (e.g., such as while in an out-of-band mode where network connectivity between the first storage controller and the second storage controller may be unreliable or unavailable). Thus, the first service processor may automatically configure service processor traps based upon the second communication configuration so that service processor traps may be sent to the second service processor for automatically triggering a switchover operation from the first storage controller to the second storage controller in the event the first storage controller fails.

Communication configuration updates may be transmitted between the service processors, such as by utilizing the disk mailboxes. In an example, responsive to the first communication configuration being updated to create an updated first communication configuration (e.g., an updated IP address, port, and/or authentication of the first service processor), the updated first communication configuration may be stored within the first disk mailbox for access by the second storage controller and/or the second service processor (e.g., the first disk mailbox may be periodically polled for updates). In another example, the first service processor may read an updated second communication configuration (e.g., updated IP address, port, and/or authentication of the second service processor) from the second disk mailbox, which may be used to update the stored second communication configuration.

At 308, responsive to determining a failure of the first storage controller, the first service processor may send a service processor trap to the second service processor using the second communication configuration. In an example, the service processor trap may include a shared secret associated with authentication implemented by the second service processor. The service processor trap may trigger the second service processor to instruct the second storage controller to automatically perform a switchover operation from the failed first storage controller to the second storage controller so that the second storage controller may provide clients with failover access to data previously provided by the failed first storage controller (e.g., access to replicated data within storage devices whose ownership was switched from the first storage controller to the second storage controller by the switchover operation). In this way, the first service processor may proactively prompt the second storage controller to perform the switchover operation, which may mitigate client data access downtime otherwise resulting from delays such as when timeouts are used to detect the failure of the first storage controller and/or manual switchovers are implemented.

In an example, the first service processor may receive a second service processor trap sent by the second service processor using the first communication configuration (e.g., the second service processor trap may be received while the first storage controller is in an operational non-failure state). The second service processor trap may indicate failure of the second storage controller. In an example, the first service processor may utilize the first authentication to evaluate the second service processor trap for security purposes (e.g., evaluate a shared secret included within the second service processor trap). The first service processor may initiate an automatic switchover operation from the failed second storage controller to the first storage controller for providing clients with failover access to data, previously accessible to clients through the second storage controller, (e.g., access replicated data of the data) based upon the second service processor trap and the first storage controller being a disaster recovery partner for the second storage controller. In this way, the second service processor may proactively prompt the first storage controller to automatically perform the switchover operation, which may mitigate client data access downtime otherwise resulting from delays such as when timeouts are used to detect the failure of the first storage controller and/or manual switchovers are implemented. At 310, the method 300 ends.

Figure 4A:
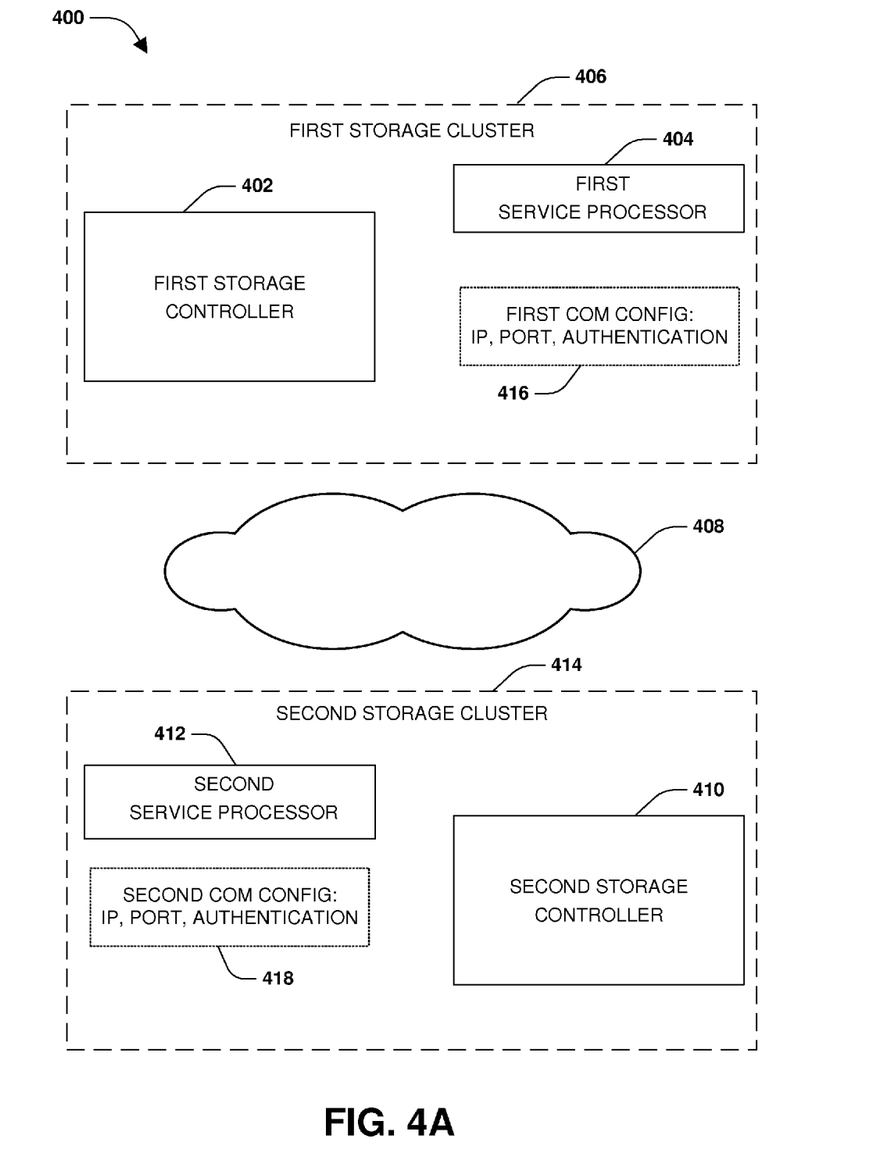
FIG. 4A is a component block diagram illustrating an exemplary computing device for communicating storage controller failures utilizing service processor traps.

FIGS. 4A-4D illustrate examples of a system 400 for communicating storage controller failures utilizing service processor traps. FIG. 4A illustrates a first storage cluster 406 comprising a first storage controller 402. The first storage controller 402 may comprise a first service processor 404 (e.g., a microcontroller comprising an operating system, health monitoring functionality, etc.). The first service processor 404 may be associated with a first communication configuration 416 specifying a first IP address, a first port, first authentication, and/or other communication information associated with the first service processor 404. The first storage controller 402 may be configured to provide clients with primary access to data stored within one or more storage devices owned by the first storage controller 402 (e.g., storage devices located at the first storage cluster 406). In an example, such data may be replicated to storage devices (e.g., owned by the first storage controller 402) located at a second storage cluster 414 for data loss protection in the event a disaster occurs at the first storage cluster 406 (e.g., in the event of the disaster, a second storage controller 410, at the second storage cluster 414, may perform a switchover operation of the storage devices, comprising the replicated data and located at the second storage cluster 414, from the first storage controller 402 to the second storage controller 410 for providing clients with failover access to the replicated data)

A second storage cluster 414 (e.g., remote to the first storage cluster 406, such as within a different building, city, etc.) may be communicatively coupled to the first storage cluster 406 through a network 408. The second storage cluster 414 may comprise the second storage controller 410. The second storage controller 410 may comprise a second service processor 412 (e.g., a microcontroller comprising an operating system, health monitoring functionality, etc.). The second service processor 412 may be associated with a second communication configuration 418 specifying a second IP address, a second port, second authentication, and/or other communication information associated with the second service processor 412.

Figure 4B:
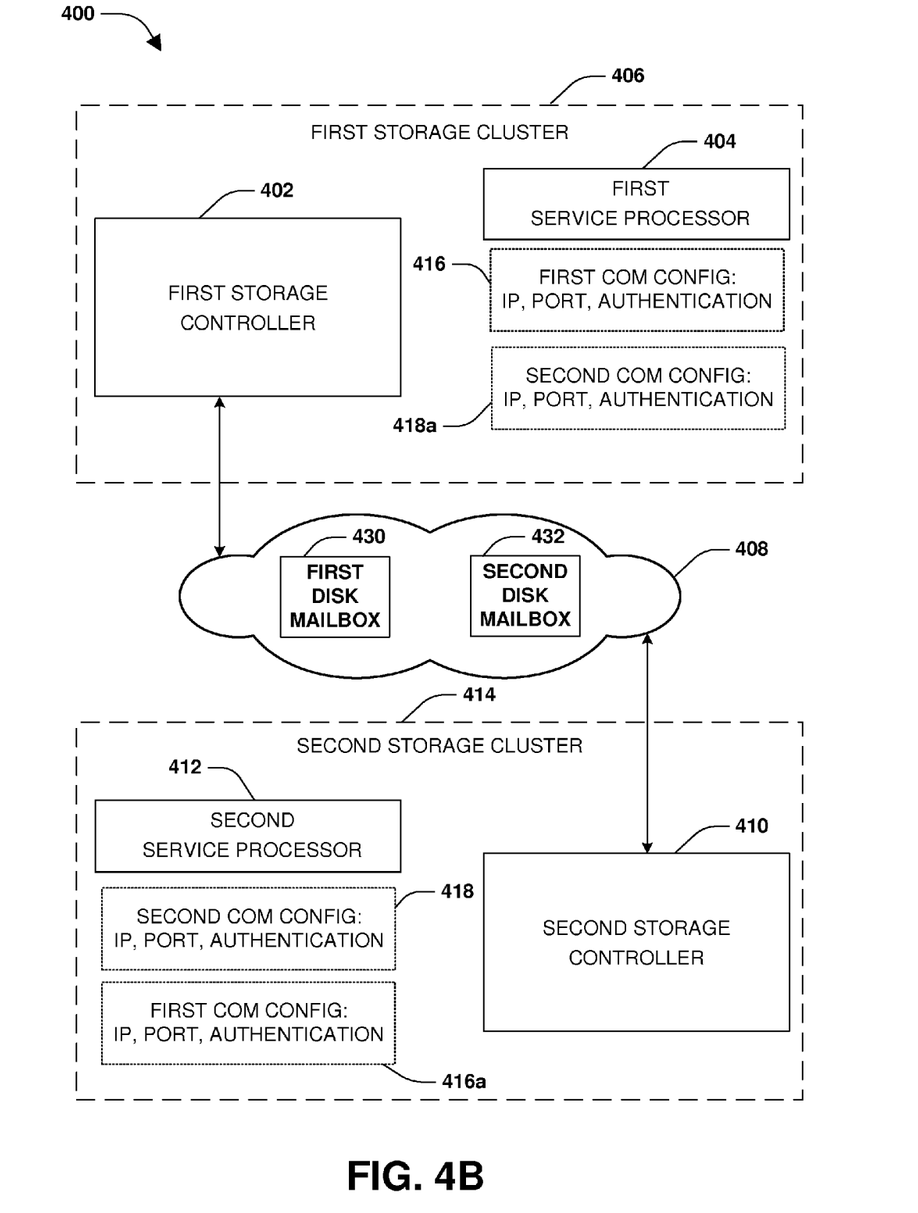
FIG. 4B is a component block diagram illustrating an exemplary computing device for communicating storage controller failures utilizing service processor traps, where communication configuration is exchanged between a first service processor and a second service processor.

FIG. 4B illustrates the first service processor 404 and the second service processor 412 sharing communication configuration information. For example, the first storage controller 402 (e.g., and/or the first service processor 404) may store the first communication configuration 416 into a first disk mailbox 430 (e.g., a storage device owned by the first storage controller 402). The second service processor 412 (e.g., and/or the second storage controller 410) may read the first communication configuration 416 from the first disk mailbox 430, and may store the first communication configuration 416 as stored first communication configuration 416a accessible to the second service processor 412. In this way, the first communication configuration 416 may be sent to (e.g., made accessible to) the second service processor 412 notwithstanding unreliable or unavailable network connectivity between the first storage controller 402 and the second storage controller 410.

The second storage controller 410 (e.g., and/or the second service processor 412) may store the second communication configuration 418 into a second disk mailbox 432 (e.g., a storage device owned by the second storage controller 410). The first service processor 404 (e.g., and/or the first storage controller 402) may read the second communication configuration 418 from the second disk mailbox, and may store the second communication configuration 418 as stored second communication configuration 418a accessible to the first service processor 404. In this way, the second communication configuration 418 may be sent to (e.g., made accessible to) the first service processor 404 notwithstanding unreliable or unavailable network connectivity between the first storage controller 402 and the second storage controller 410.

Figure 4C:
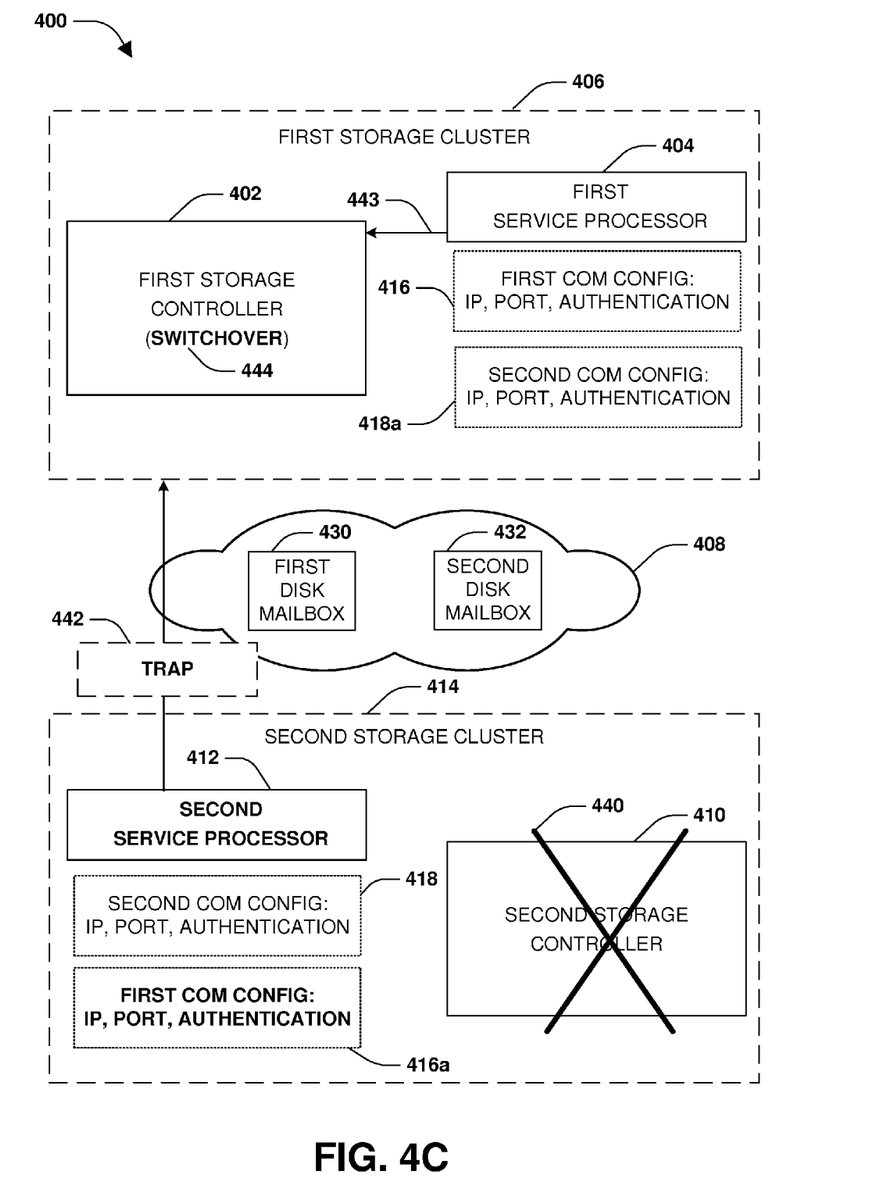
FIG. 4C is a component block diagram illustrating an exemplary computing device for communicating storage controller failures utilizing service processor traps, where a service processor trap is sent to a first service processor for triggering automatic switchover from a failed second storage controller to a first storage controller.

FIG. 4C illustrates the second service processor 412 detecting a failure 440 (e.g., a power loss) of the second storage controller 410. For example, the second service processor 412 may detect a heartbeat failure of the second storage controller 410 or may utilize any other failure detection mechanism. The second service processor 412 may utilize the stored first communication configuration 416a to send a service processor trap 442 to the first service processor 404. For example, the service processor trap 442 may be sent to the first IP address and the first port used by the first service processor 404. The service processor trap 442 may include authentication information, such as a shared secret, from the stored first communication configuration 416a. Responsive to receiving the service processor trap 442 (e.g., and/or evaluating the shared secret for authentication/security purposes), the first service processor 404 may initiate 443 the first storage controller 402 to perform a switchover operation 444. The switchover operation 444 may be used to switch ownership of storage devices from ownership by the second storage controller 410 to ownership by the first storage controller 402 (e.g., switchover of a storage device, located at the first storage cluster 406 but owned by the second storage controller 410, comprising replicated data that is replicated from a primary storage device used by the second storage controller 410 to provide clients with primary access to data within the primary storage device). In this way, the first storage controller 402 may provide clients with failover access to data from the switched over storage devices (e.g., access to the replicated data within the storage device). Because the second service processor 412 proactively used the service processor trap 442 to prompt the first service processor 404 to initiate the switchover operation 444 by the first storage controller 402, client data access downtime may be mitigated because timeouts, manual switchovers, and/or other slower or unreliable techniques are not relied upon.

Figure 4D:
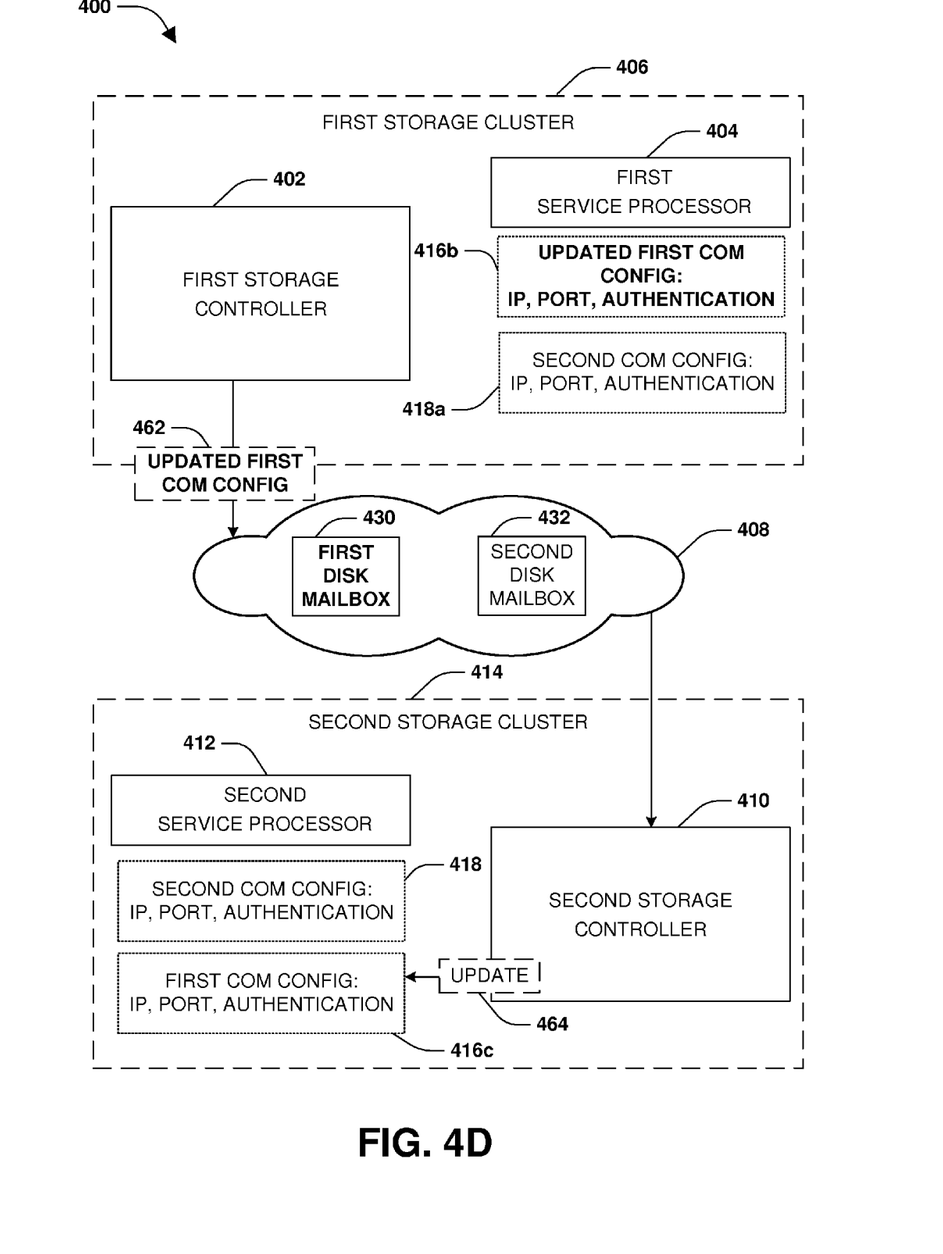
FIG. 4D is a component block diagram illustrating an exemplary computing device for communicating storage controller failures utilizing service processor traps, where updated communication configuration is exchanged between a first service processor and a second service processor.

FIG. 4D illustrates an example where the first service processor 404 updates the first communication configuration 416 to create updated first communication configuration 416b. For example, the first service processor 404 may utilize a new IP address, port, and/or authentication. The updated first communication configuration 416b may be stored 462 within the first disk mailbox 430 by the first storage controller 402 (e.g., and/or by the first service processor 404). The second storage controller 410 (e.g., and/or the second service processor 412) may read the updated first communication configuration 416b from the first disk mailbox 430, and may update 464 the stored first communication configuration 416a to create updated stored first communication configuration 416c accessible to the second service processor 412 for configuring service processor traps.

Figure 5:
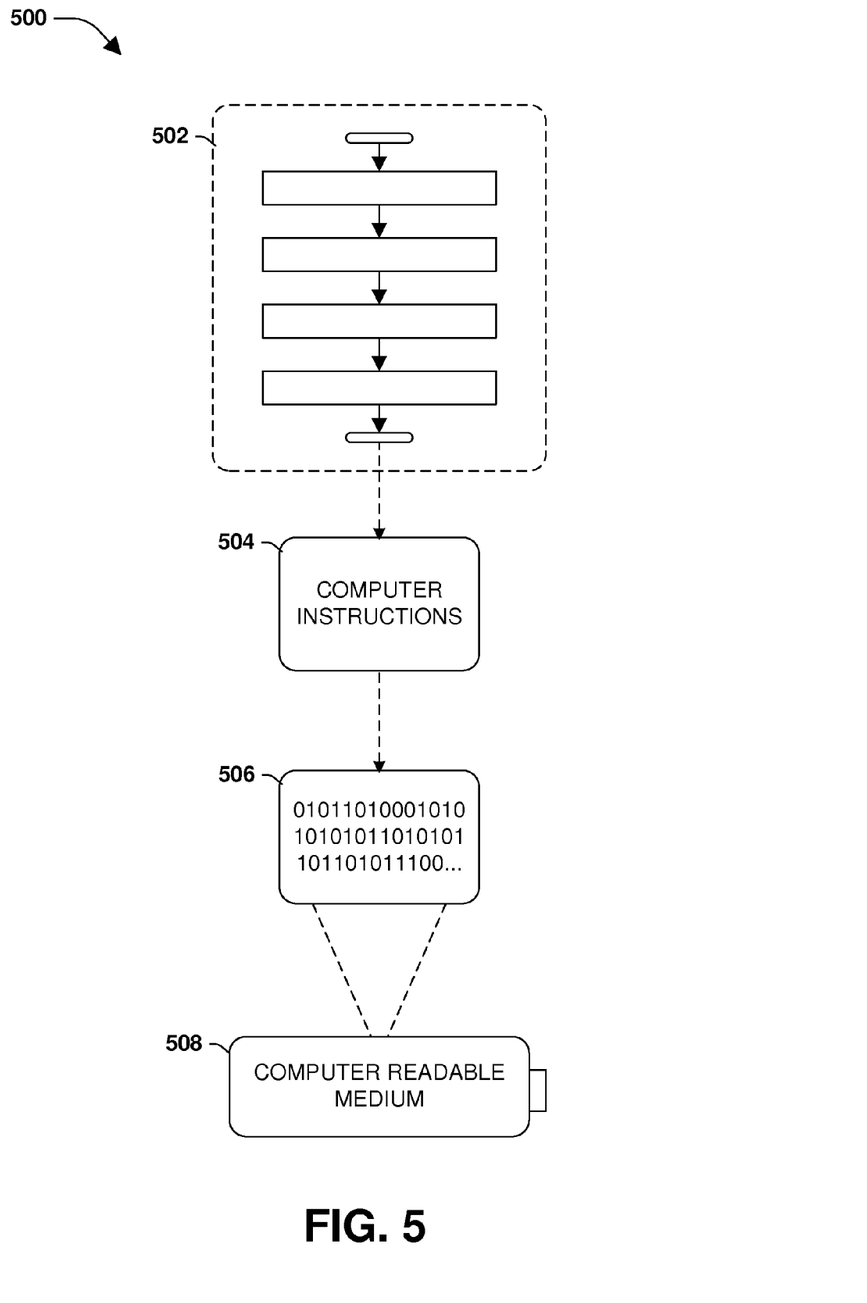
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-ft DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable instructions 504 are configured to implement a system, such as at least some of the exemplary system 400 of FIGS. 4A-4D, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
performing a communication configuration exchange between a first service processor of a first computing device and a second service processor of a second computing device configured as a disaster recovery partner for the first computing device, wherein the performing comprises:
storing, by the first service processor, a first communication configuration of the first service processor within a first disk mailbox for access by the second service processor over a network for acquiring the first communication configuration; and
reading, by the first service processor over the network, a second communication configuration of the second service processor from a second disk mailbox populated with the second communication configuration by the second service processor;
determining a failure of the first computing device; and
performing service processor to service processor communication to send a service processor trap from the first service processor to the second service processor using the second communication configuration.

2. The method of claim 1, comprising:
receiving a second service processor trap sent by the second service processor to the first service processor using the first communication configuration, the second service processor trap indicating failure of the second computing device; and
initiating an automatic switchover operation from the second computing device to the first computing device for providing clients with failover access to data, previously accessible to clients through the second computing device, based upon the second service processor trap and the first computing device being the disaster recovery partner for the second computing device.

3. The method of claim 1, wherein the first communication configuration comprises a first port used by the first service processor.

4. The method of claim 1, wherein the second communication configuration comprises a second port used by the second service processor.

5. The method of claim 1, wherein the first communication configuration comprises first authentication implemented by the first service processor and the second communication configuration comprises second authentication implemented by the second service processor.

6. The method of claim 1, wherein the sending a service processor trap comprises:
including a shared secret, associated with authentication implemented by the second service processor, within the service processor trap.

7. The method of claim 2, wherein the receiving a second service processor trap comprises:
evaluating a shared secret, included within the second service processor trap, utilizing authentication implemented by the first service processor.

8. The method of claim 1, wherein the storing comprises:
storing the first communication configuration within the first disk mailbox owned by the first computing device and accessible to the second computing device.

9. The method of claim 1, wherein the reading comprises:
reading the second communication configuration from the second disk mailbox owned by the second computing device and accessible to the first computing device.

10. The method of claim 8, comprising:
updating the first communication configuration to create an updated first communication configuration; and
storing the updated first communication configuration within the first disk mailbox for access by the second computing device.

11. The method of claim 10, wherein the updated first communication configuration comprises an updated first internet protocol (IP) address of the first service processor.

12. The method of claim 9, comprising:
reading an updated second communication configuration from the second disk mailbox.

13. The method of claim 12, wherein the updated second communication configuration comprises an updated second internet protocol (IP) address of the second service processor.

14. The method of claim 1, comprising storing a third communication configuration, comprising:
automatically configuring service processor traps based upon the third communication configuration.

15. The method of claim 1, wherein the first service processor comprises a battery used to power the first service processor in the event the first computing device loses power.

16. A non-transitory machine readable medium having stored thereon instructions for performing a method comprising machine executable code which when executed by at least one machine, causes the machine to:
perform a communication configuration exchange between a first service processor of a first computing device and a second service processor of a second computing device configured as a disaster recovery partner for the first computing device, comprising:
storing, by the first service processor, a first communication configuration of the first service processor within a first disk mailbox for access by the second service processor over a network for acquiring the first communication configuration; and
reading, by the first service processor over the network, a second communication configuration of the second service processor from a second disk mailbox populated with the second communication configuration by the second service processor;

perform service processor to service processor communication to receive a service processor trap sent by the second service processor to the first service processor using the first communication configuration, the service processor trap indicating failure of the second computing device; and initiate an automatic switchover operation from the second computing device to the first computing device for providing clients with failover access to data, previously accessible to clients through the second computing device, based upon the service processor trap and the first computing device being the disaster recovery partner for the second computing device.

17. The non-transitory machine readable medium of claim 16, wherein the machine executable code causes the machine to:

determine a failure of the first computing device; and send a second service processor trap from the first service processor to the second service processor using the second communication configuration.

18. The non-transitory machine readable medium of claim 16, wherein the machine executable code causes the machine to:

read the second communication configuration from the second disk mailbox owned by the second computing device and accessible to the first computing device.

19. A computing device comprising:

a memory containing instructions for performing a method of communicating storage controller failures utilizing service processor traps; and a processor coupled to the memory, the processor configured to execute the instructions to cause the processor to:

perform a communication configuration exchange between a first service processor of a first computing device and a second service processor of a second computing device configured as a disaster recovery partner for the first computing device, comprising:

storing, by the first service processor, a first communication configuration of the first service processor within a first disk mailbox for access by the second service processor over a network for acquiring the first communication configuration; and reading, by the first service processor over the network, a second communication configuration of the second service processor from a second disk mailbox populated with the second communication configuration by the second service processor;

determine, by the first service processor, a failure of the first computing device; and perform service processor to service processor communication to send a service processor trap from the first service processor to the second service processor using the second communication configuration.

20. The computing device of claim 19, wherein the first service processor comprises a microcontroller hosting an operating system and storage controller health monitoring functionality used to determine the failure, wherein the microcontroller comprises a power source separate from the first computing device.

* * * * *